Sept. 21, 1926.

C. J. MANSON

CORN HARVESTER

Filed Jan. 30, 1923

INVENTOR
CHARLES JAMES MANSON
BY
William S. Fowler
ATTORNEY

Sept. 21, 1926.
C. J. MANSON
CORN HARVESTER
Filed Jan. 30, 1923
1,600,836
2 Sheets-Sheet 2
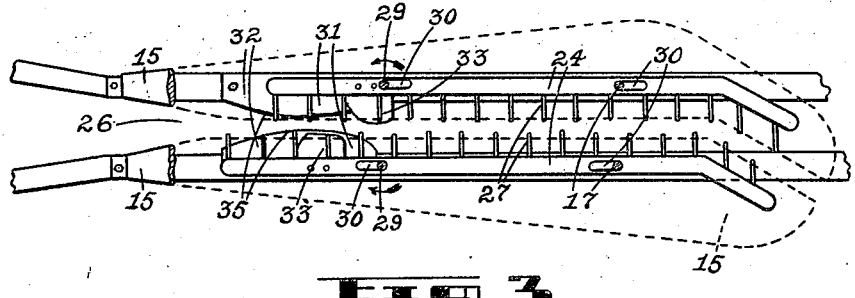
Fig. 3.
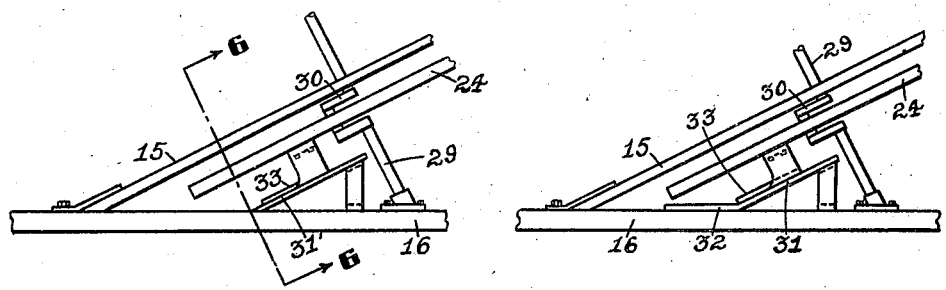
Fig. 5. Fig. 4.
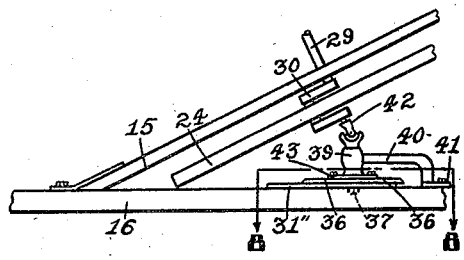
Fig. 6.
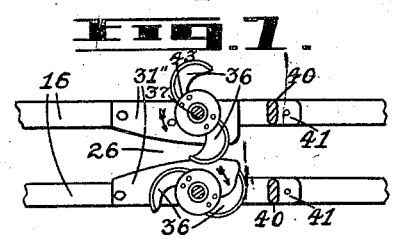
Fig. 7.
Fig. 8.
INVENTOR
CHARLES JAMES MANSON
BY
*William S. Fowler*
ATTORNEY Patented Sept. 21, 1926.

1,600,836

UNITED STATES PATENT OFFICE.

CHARLES JAMES MANSON, OF RAMSEYVILLE, ONTARIO, CANADA.

CORN HARVESTER.

Application filed January 30, 1923. Serial No. 615,796.

This invention has relation to certain new and useful improvements in corn harvesters particularly the part known as the packer and has for its primary object the provision of an improved structure which will operate efficiently to cut, gather and hold the corn stalks for binding without danger of the stalks catching in the machine and thereby interfering with proper operation of the same.

Another object of the invention resides in the provision of a corn harvester including a feed-way having corn stalk engaging and advancing rack bars arranged on each side of said feed-way in opposed and superposed relation; and means for moving said corn stalk engaging and advancing rack bars longitudinally with respect to said feed-way limited distances, to cause said corn stalk engaging and advancing rack bars to extend into said feed-way; engage and advance corn stalks a limited distance in said feed-way, recede from said feed-way and disengage said corn stalks, retract adjacent to and longitudinally of said feed-way, and again approach, engage and advance corn stalks in said feed-way.

Another object of the invention resides in the provision of a corn harvester of the character stated in which the rack bars and the movable cutting knives are arranged for alternate operation to continuously advance the corn stalks therebetween to the binding mechanism.

A further object of the invention resides in the provision of a corn harvester of the character stated in which the inclined pairs of rack bars are mounted in such a manner on the crank shaft that each rack bar operates oppositely to the rack bar or bars immediately above or below the same, all of the rack bars co-operating to steadily advance the stalks between the pairs of rack bars from the forward end thereof to the rear end for delivery to the binding mechanism of the corn harvester.

In conjunction with the foregoing, the invention has for a further object the provision of a supporting frame including a plurality of rearwardly upwardly inclined tables having a feed-way therebetween; stationary cutting knives for severing corn stalks arranged in said feed-way; corn stalks advancing rack bars arranged in opposed and superposed relation in close proximity to said tables mounted upon crank shafts adapted for moving said rack bars longitudinally with respect to said feed-way limited distances, alternatively in reversed directions for continuously advancing corn stalks in said feed-way and constraining the same perpendicular with respect to the surface of the ground traversed by the corn harvester; and corn stalk severing knives arranged on the lowermost pair of said rack bars for co-acting with said stationary cutting knives to sever corn stalks during advancement thereof in said feed-way.

With the foregoing and other objects in view as will appear as the description proceeds, the invention consists in the novel construction, combination, and arrangement of co-operating elements as hereinafter more specifically set forth, claimed and shown in the accompanying drawings forming a part of the present application, in which:

Fig. 3 is a plan view of the lower deck.

Fig. 4 is a side elevation of a part of the structure shown in Fig. 3.

Fig. 5 is a view corresponding to Fig. 4 and of a slightly modified form of the invention.

Fig. 6 is a transverse section substantially on the plane of line 6—6 of Fig. 5, looking in the direction indicated by the arrows.

Fig. 7 is a view similar to Figs. 4 and 5 showing a further modification of the invention.

Fig. 8 is a sectional view substantially on the plane of line 8—8 of Fig. 7, looking in the direction indicated by the arrows.

Figure 1:
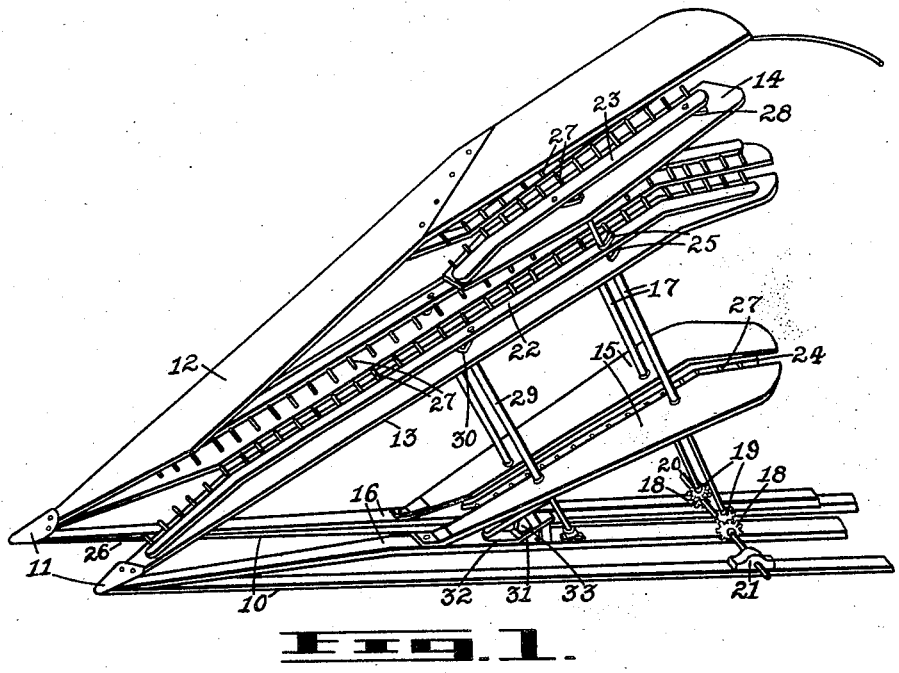
Fig. 1 is a perspective view of the improved portion of the corn harvester.
Figure 2:
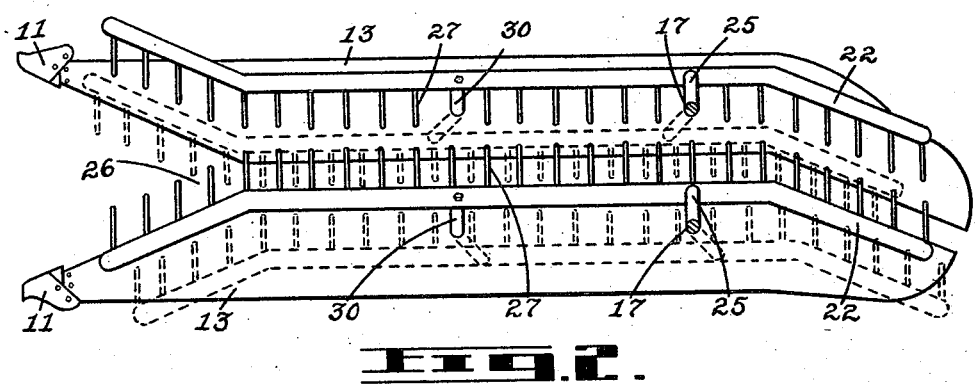
Fig. 2 is a plan of the structure disclosed in Fig. 1 with the upper portions of the supporting guide structure and the uppermost pair of rack bars removed.

Referring more in detail to the drawings in which similar reference characters designate corresponding parts throughout the several views, it will be noted that the forwardly projecting runners 10 have the shoes 11 mounted on their forward ends and covering the lower pointed ends of the inclined projecting cover members 12 which extend over the uppermost pair of inclined tables 13 and the auxiliary short inclined tables 14 positioned above the tables 13. This may be readily understood by referring to Fig. 1. A pair of lower inclined tables 15 are also supported beneath and parallel with the greater portions of the tables 13 the lower ends of the table 15 being secured on the upper members 16 of the runners 10.

A pair of rear, forwardly inclined crank shafts 17 are extended through the tables 13, 14 and 15 and carry bevelled gears 19 on their lower ends meshing with the driving gears 18 which in turn are carried on the transverse drive shaft 20 mounted in suitable bearings 21 provided for this purpose on the rear portions of the runners 10. Rack bars 22, 23 and 24 are arranged in pairs on the tables 13, 14 and 15, respectively, and mounted on crank portions 25 of the crank shafts 17 in such a manner as to cause movement of the rack bars 23 toward and away from the feed-way 26 (which feed-way 26 extends between the runners 10 and also between the tables 13, 14 and 15). The rack bars 22, 23 and 24 also move toward the opposite ends of the tables 13, 14 and 15, when the crank shafts 17 are rotated. Each of the rack bars 22, 23 and 24 is provided along one side with equally spaced rack teeth 27, the purpose of which will presently appear. It will also be seen from Fig. 1 that crank members or links 28 are employed to connect the rack bars 23 with the auxiliary uppermost tables 14 and such crank members or links 28 correspond to and co-operate with the crank portions 25 of the crank shafts 17 to assure proper operation of the rack bars 23. A second pair of crank shafts 29 are extended through the tables 13 and 15 and provided with crank portions 30 on which are mounted the forward portions of the rack bars 22 and 24. The crank portions 25 of the crank shafts 17 and crank portions 30 of the crank shafts 29 are arranged so that the ends of the respective rack bars 22 and 24 move together. The respective crank portions 25 and 30 are positioned on the crank shafts 27 and 29, however, so that opposite rack bars 22 and the upper rack bars 24 work opposite to one another. Each rack bar 22 and 24 also works opposite to the rack bar immediately above or below the same. Furthermore, the respective rack bars 23 work oposite to the corresponding rack bars 22. This causes a movement of each rack bar 22, 23 and 24 toward the feed-way 26 as the corresponding rack bar 22, 23 and 24 is moving away from the feed-way 26. The result is action on the upper and lower portions of each stalk travelling through the feed-way 26 from one side of the machine and action on the central portion of the stalk on the other side of the machine. The reverse action on the stalk immediately follows the first action and owing to the path of travel of the various rack bars 22, 23 and 24 the stalk is elevated through the feed-way 26 by the various rack bars 22, 23 and 24 alternately thereby causing a steady movement of the stalk toward the upper ends of the rack bars 22, 23 and 24 for delivery to the binding mechanism of the machine and which is not disclosed in the present application as it does not form a part of this invention.

It will be noted from the several views of the drawings that the tables 13, 14 and 15 are turned and bevelled at their opposite ends in the same manner as the conventional form of corn binders and the cover members 12 are shaped to correspond, the cover members 12 being raised sufficiently to avoid the rack bars 22 and 23 and the tables 14, as shown clearly in Fig. 1. It may also be stated at this time that the upper ends of the respective rack bars 22, 23 and 24 are terminated a suitable distance from the upper ends of the tables 13, 14 and 15 on which they are mounted. Furthermore, the lower ends of the rack bars 22 and 23 diverge so as to permit the stalks to readily pass between the same during operation of the machine.

Mounted on the lower ends of the tables 15 are the stationery knives 31 which have bent lower ends 32 extending onto and secured on the adjacent portions of the upper members 16 of the runners 10, the opposed cutting edges of the lower forward portions 32 of the stationary knives 31 being of arcuate form and diverging so that the corn stalk being approached by the stationary knives 31 may be readily received therebetween and severed at a point near the surface. A pair of movable arcuate knives 33 are carried on the under face of the rack bars 24 at the lower ends thereof for operation over and adjacent to the main portions of the stationary knives 31, the pair of movable knives 33 following one another across the feed-way 26, one of the movable knives 33 moving in its circle in a clockwise direction while the other moveable knives 33 operate in its circle in a counter-clockwise direction. It will be evident that the pair of movable arcuate knives 33 will serve to finish the severing or cutting of the stalks and trim off any ragged edges thereof which may remain after the cutting of the stalks by the stationary knives 31. By referring to Fig. 3 it will also be noted that the movable arcuate knives 33 are spaced below the rack bars 24 thereby bringing the movable arcuate knives 33 into close engagement with the upper face of the main or inclined portions of the stationary knives 31.

In Figs. 5 and 6 a modified form of the invention is disclosed in which stationary cutting knives 31' are substituted for the stationary knives 31 of the improved form. The modified form of stationary cutting knives 31' include only inclined portions secured on the upper member 16 of the runners 10 beneath the movable arcuate knives 33. The stationary cutting knives 31' have opposed arcuate cutting edges 35 practically corresponding with the cutting edges of the movable arcuate knives 33. In other respects, the modified form corresponds to the improved form in construction and operation. It will be evident, however, that all of the cutting of the stalks will be on a diagonal or inclined line when the modified form is employed; while in the improved form the first cutting operation is in a horizontal plane and the final cutting and trimming is in an inclined plane.

A further modified form of the invention is disclosed in Figs. 7 and 8 in which the stationary cutting blades 31″ are in a horizontal plane and mounted directly on the upper member 16 of the runner 10. This may be clearly seen by referring to Fig. 8 which also discloses the fact that the opposed cutting edges of the stationary blades 31″ are suitably curved to assure efficient operation thereof on the stalks presented between the same. Pairs of arcuate movable blades 36 are provided above each stationary cutting blade 31″ and adapted to operate over the latter and across the space between the stationary cutting blades 31″. Each pair of arcuate movable blades 36 is carried on a vertical shaft 37 having its lower end extended through the stationary cutting blade 31″ over which the pair of arcuate movable blades 36 operate and projecting into the upper member 16 beneath said stationary cutting blade 31″. The pair of arcuate movable blades 36 extend from diametrically opposite portions of the shaft 37 close to the upper face of the stationary cutting blade 31″ and the arcuate movable blades 36 are curved in corresponding planes. The arcuate movable blades 36 on the two shafts 37 are arranged so that the arcuate movable blades 36 on the two shafts 37 follow one another across the cutting edges of the stationary cutting blades 31″ as the two shafts 37 are rotated toward one another, the arcuate movable blades 36 of the two shafts 37 alternating in their turn of travel across said cutting edges of the stationary cutting blades 31″ and the space between the same. The shafts 37 are rotatably mounted in suitable bearings 39 on one end of bearing brackets 40 mounted by their other ends 41 on the upper members 16, as shown clearly in Fig. 7. A universal joint connection 42 is formed between the upper end of each shaft 37 and the lower end of the crank shaft 29 working above the same. The universal joint connection 42 is necessary owing to the crank shaft 29 being inclined while the shaft 37 is vertical. It is also to be noted that each pair of arcuate movable blades 36 are preferably secured at their inner ends direct to the flange or disk 43 carried concentrically on the shaft 37, below the bearing 39. It will be seen that all of the cutting is done in a horizontal plane when this last form of the invention is employed. It is further apparent that all of the other parts of the invention are to be constructed and arranged in the same manner as described in connection with the other forms and therefore further detail description is unnecesary.

It is believed the complete construction and operation may now be apparent from the foregoing paragraphs taken in connection with the accompanying drawings without further detailed description. It may be briefly stated, however, that as the machine is operated and passes along the rows of corn stalks, the runner 10 with the parts supported on the same pass along opposite sides of the row so that the corn stalks enter and travel along the feed-way 26. As the stationary lower knives 31, 31′ or 31″ engage the corn stalks in turn, the latter are severed near the ground. At the end of this operation, the movable upper knives 33 or 36 complete the cutting operation and trim the ends of the stalks as they are engaged by the teeth 27 of the lower pair of rack bars 24 and advance further along the feed-way 26. It is to be understood that the teeth 27 on the rack bars 22 engage opposite sides of the stalks alternately and advance the same along the feed-way 26 even previous to engagement of the stalks by the stationary lower cutting knives 31, 31′ or 31″. Shortly after the cutting of the stalks, the teeth 27 on the uppermost pair of rack bars 23 begin operaion on opposite sides of the corn stalks to assist in the steady advancement of the same along the rear and upper portion of the feed-way 26 and proper delivery of the stalks to the binding mechanism of the machine. It is apparent that the shoes 11 will co-operate with the runners 10 and the cover members 12 to raise fallen stalks and properly present the same to the rack bars 22 for later engagement by the stationary lower cutting knives 31, 31′ or 31″ and the teeth 27 of the rack bars 24 and 23. The positive operation of the various rack bars 22, 23 and 24 by the crank shafts 17 is assured by the driving of the crank shafts 17 from the transverse drive shaft 20. The alternate engagement of the corn stalks from the opposite sides of the machine and at different portions of the stalks throughout the length thereof during movement in upright position along the guide passage 26 is also assured by the special arrangement of the crank portions 25 on the crank shafts 17 and the crank portions 30 on the crank shafts 29, as previously described in detail. This arrangement and operation of the pairs of rack bars 22, 23 and 24 with the teeth 27 for engaging and advancing the corn stalks on each operation of the rack bars 22, 23 and 24 eliminates danger of the corn stalks becoming caught and held in the feed-way 26 and thereby clogging up and stopping operation of the machine.

While the preferred embodiment of the invention has been disclosed it is to be understood that minor changes in the details of construction, combination and arrangement of co-operating elements may be resorted to within the scope of what is claimed without departing from the spirit of the invention.

What I claim as new is:—

1. A corn harvester including, in combination, a feed-way; stationary cutting knives arranged in said feed-way; corn stalk engaging and advancing members arranged at the sides of said feed-way in pairs, and in opposed and superposed relation; cutting knives mounted upon the lowermost pair of said corn stalk engaging and advancing members; and means for moving said corn stalk engaging and advancing members longitudinally with respect to said feed-way limited distances to cause said corn stalk engaging and advancing members to extend into said feed-way, engage and advance corn stalks a limited distance in said feed-way, recede from said feed-way and disengage said corn stalks and retract adjacent to and longitudinally of said feed-way and again approach, engage and advance corn stalks in said feed-way.

2. A corn harvester including, in combination, a feed-way; stationary cutting knives arranged in said feed-way; corn stalk engaging and advancing members arranged at the sides of said feed-way in opposed and superposed relation; cutting knives on the lowermost pair of said corn stalk engaging and advancing members adapted to co-operate with said stationary cutting knives to sever corn stalks upon actuation of said lowermost pair of corn stalk engaging members; and means for moving said corn stalk engaging members longitudinally with respect to said feed-way limited distances to extend the same into said feed-way, engage and advance corn stalks a limited distance in said feed-way, recede from said feed-way and disengage said corn stalks, and retract adjacent to and longitudinally of said feed-way and again approach, engage and advance corn stalks in said feed-way.

3. A corn harvester including, in combination, a feed-way; stationary cutting knives arranged in said feed-way; corn stalk engaging and advancing members arranged at the sides of said feed-way in pairs, in opposed and superposed relation; cutting knives mounted upon the lowermost pair of said corn stalk engaging and advancing members; means for actuating said lowermost pair of corn stalk engaging and advancing members in contrary directions to operate one of said cutting knives in a circle in a clock-wise direction and the other knife upon said corn stalk engaging and advancing member in a circle in a counterclock-wise direction; and means for moving all of said corn stalk engaging and advancing members longitudinally with respect to said feed-way limited distances to cause said corn stalk engaging and advancing members to extend into said feed-way, engage and advance corn stalks a limited distance in said feed-way, recede from said feed-way and disengage said corn stalks, and retract adjacent and longitudinally of said feed-way, and again approach, engage and advance corn stalks in said feed-way.

In testimony whereof, I affix my signature.

CHARLES JAMES MANSON.